(12) United States Patent
Pongracz et al.

(10) Patent No.: US 8,040,805 B2
(45) Date of Patent: Oct. 18, 2011

(54) LOAD CONTROL IN A COMMUNICATION NETWORK

(75) Inventors: Gergely Pongracz, Budapest (HU); Daniel Krupp, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 12/445,060

(22) PCT Filed: Oct. 9, 2006

(86) PCT No.: PCT/EP2006/067212
§ 371 (c)(1),
(2), (4) Date: Feb. 24, 2010

(87) PCT Pub. No.: WO2008/043391
PCT Pub. Date: Apr. 17, 2008

(65) Prior Publication Data
US 2010/0165844 A1    Jul. 1, 2010

(51) Int. Cl.
*H04L 12/26* (2006.01)

(52) U.S. Cl. ............... 370/232; 370/230; 370/230.1; 370/235; 370/236

(58) Field of Classification Search ............ None
See application file for complete search history.

(56) References Cited

U.S. PATENT DOCUMENTS

| | | | | |
|---|---|---|---|---|
| 5,367,523 A | * | 11/1994 | Chang et al. | 370/235 |
| 2003/0128664 A1 | * | 7/2003 | Connor | 370/229 |

FOREIGN PATENT DOCUMENTS

| | | | |
|---|---|---|---|
| WO | WO 2005/084041 A | | 9/2005 |
| WO | WO 2005084041 A2 | * | 9/2005 |

* cited by examiner

*Primary Examiner* — Huy D Vu
*Assistant Examiner* — James P Duffy

(57) ABSTRACT

A gateway apparatus for interfacing an access network 1 to a service network 3, the apparatus comprising an input for receiving access requests from the access network at a first flow rate, an output for forwarding access requests to a gateway controller at a second flow rate, and a flow controller for controlling the flow of access requests from said input to said output. The flow controller comprises a receiver for receiving a restrict ion value from the gateway controller, first processing means for determining whether the received restriction value is more restrictive than any currently in use restriction value and, if so, for determining a leak rate on the basis of the received restriction value and the current second flow rate, and second processing means for allowing access requests to pass to said output at a rate up to the determined leak rate at least until a further restriction value is received.

9 Claims, 3 Drawing Sheets

LOAD CONTROL IN A COMMUNICATION NETWORK

TECHNICAL FIELD

The present invention relates to load control in a communication network. It is applicable in particular, though not necessarily, to overload control in a telecommunication network employing access gateways and access gateway controllers.

BACKGROUND

Within telecommunication networks it is desirable to separate out the signalling level from the bearer or traffic level in order to facilitate interoperability of components supplied by different vendors as well as the interoperability of different network technologies. To this end, the Internet Engineering Task Force (IETF) has specified the protocol known as H.248 (H.248 v2: draft-ietf-megaco-h248v2-04.txt) which is a signalling protocol used between an access node (or Media Gateway, MG) and a controller node (or Media Gateway Controller, MGC). H.248 is used amongst other things for controlling the setup of a call.

Telecommunication networks must be engineered to withstand not only normal load conditions, but also expected and unexpected overload conditions. Such overloads may occur, for example, as a result of a media initiated televoting process or a disaster, e.g. an earthquake. Overloads are typically handled by rejecting call set-up requests at an appropriate network node. However, this in itself may not be sufficient as even the offering of set-up requests to a node may cause that node to fail (and restart).

Consider a NGN comprising a Media Gateway Controller (MGC). In a typical network architecture, the MGC is likely to be connected to thousands of Multi Service Access Nodes (MSANs) which provide interfaces between the Public Switched Telephone Network (PSTN) and IP networks. It can be envisaged that a sufficiently large step change in the load offered to the MGC is likely to cause the MGC to become grossly overloaded to a level where its own internal overload protection mechanism may not provide satisfactory protection.

The ETSI draft [ETSI ES 2XX XXX V<0.0.5> (2006-06), Access Gateway—Media Gateway Controller Rate Based Overload Control] known as "ETSI_NR" proposes an overload control mechanism between the MGCs and the MSANs to protect the MGCs from becoming overloaded during the previously described mass call events. ETSI_NR proposes employing an overflow restrictor at the AGWs to throttle originating (PSTN) call attempts towards the MGCs. A so-called LoadLevel supervision function is implemented in the MGC which periodically measures its load state. If the LoadLevel reaches a critical value, the MGC initiates an originating call restriction mechanism at the MSANs. During periods of overload, the MGC periodically calculates a GlobalLeakRate based on the current LoadLevel. This GlobalLeakRate is then distributed among the AGWs based on their associated predefined weights ($w_i$). The parameter $w_i$ may be set according to the number of "lines" terminated by a MSAN. A new leak rate value (notrat=$w_i$. GlobalLeakRate) is sent to the gateway in a subsequent H.248 MODIFY command. The initial value of the GlobalLeakRate, which is used when the overload is first detected at the MGC, is a configuration parameter called InitGlobalLeakRate. It is set to a sufficiently low value to immediately relieve congestion at the MGC, and the calculated GlobalLeakRate is expected to adapt upwards gradually to ensure high utilization of the MGC.

In the event of an overload at the MGC, a MSAN will set its leak rate for incoming call attempts to the rate received from the MGC. The MSAN maintains a buffer of fixed size for receiving and queuing incoming call attempts. According to ETSI_NR, the MSAN will drain call attempts from the front of the buffer at the assigned leak rate. If there is no room for an incoming call attempt at the back of the buffer, that attempt is rejected by the MSAN.

A problem with the ETSI_NR approach is that imbalances in the distribution of incoming call attempts at the MSANs may render the overload control process ineffective. Consider for example a first group of MSANs which are receiving a very high volume of call attempts and a second group of MSANs which are receiving only a very low volume of call attempts. An overload condition at the MGC will be due to the first group of MSANs. The response of the MGC will be to apply the same GlobalLeakRate to all MSANs, temporarily removing the overload. If the traffic demand suddenly increases in the area served by the second group of MSANs, the MSANs of the second group are immediately allowed to offer up calls to the MGC at the rate previously set by the MGW (i.e. notrat). Assuming that the call volumes handled by the first group of MSANs has not fallen significantly, the MGC will return to an overload condition.

This scenario is illustrated in FIG. 1, where the MGC is assumed to be a Telephony Server (TeS) node and there are four MSANs connected to it. Each MSAN has an equal weighting $w_i$ as each terminates the same number of subscriber lines. When the group of nodes designated "Group A" (comprising MSAN 1 and MSAN 2) offers a higher calling rates than the capacity of the TeS, the TeS will detect an overload, set the GlobalLeakRate to the InitGlobalLeakRate, and send ¼ of this GloballeakRate to each of the four MSANs. The TeS gradually increases the GlobalLeakRate to increase its utilization, and it continues this process until the total incoming rate from the MSANs reaches C, the processing capacity of the TeS. Assuming that the MSANs of "Group B" are offering only a very low volume of call attempts, GlobalLeakRate will increase further until it reaches 2C, at which point the leak rate (notrat) offered to each MSAN is equal to almost C/2. If the MSANs of group B start to receive a higher volume of call attempts, these will be passed on to the TeS as these nodes are allocated a leak rate of C/2 resulting in a return to the overload condition.

Another potential problem with the ETSI_NR process relates to the speed at which it can adapt to the changes in the offered rate. Assuming that all of the AGWs (e.g. TeS in FIG. 1) are equally weighted, and a group 'A' contains m nodes whilst a group 'B' contains n nodes, then each weight will be set to $w_i=1/(m+n)$. Assume again that the call processing capacity of the MGC is 'C'. If the overload condition (i.e. with the AGWs of group A providing most of the load) persists for long enough, the GlobalLeakRate (G) of the MGC may settle to approximately $G_a C^*(m+n)/m$. Each AGW that is offering calls to the MGC will receive a leak rate of $G^* w_i = C/m$. The higher the fraction $(m+n)/m >= 1$ is, the higher the adaptation point $G_a$ will be relative to the call processing capacity C. In the case of a severely focussed load, for example with almost all of the load being supplied by only 10% of the AGWs, the GlobalLeakRate could rise to ten times the call processing capacity. The very large potential range of GlobalLeakRate values will make it difficult for the MGC to adapt smoothly to changes in the load offered to it.

In addition, the ETSI-NR proposal fails to tackle the problem of how to properly terminate the overload control process. Since call admission control is not performed on the MGC, the MGC does not know when calculating the leak rate whether the MSANs are still restricting traffic, or the overload event has ceased. ETSI_NR suggests simply using a timer, 'TerminationPendingTime'. The timer is started when the measured LoadLevel at the MGC falls below the GoalLoadLevel. If the measured LoadLevel does not go above the GoalLoadLevel while the timer is running, the control process will be switched off upon its expiry. However, a LoadLevel below the GoalLoadLevel does not necessarily mean that the overload condition has ceased, as it is possible that the control process is over-restricting the flow of call attempts through the MSANs. If the control process terminates whilst the leakrate is still adapting upwards and the overload condition remains, the MGC will soon be overloaded again. The control process will be switched back on with GlobalLeakRate set to IntialGlobalLeakRate, possibly leading to an on-off oscillation of the control process and under utilization of the MGC.

An alternative to ETSI_NR is proposed in the ETSI draft [ETSI ES 2XX XXX V<0.0.1> (2005-mm), Access Gateway—Media Gateway Controller Overload Control] and is referred to as ETSI_NB. ETSI_NB proposes that a percentage based restriction should be used to decrease the intensity of originating call attempts at each MSAN when the MGC is in overload. The LoadLevel supervision function works the same way as in the case of ETSI_NR, but instead of calculating GlobalLeakRate, it calculates a percentage restriction factor and sends this to the MSANs. A MSAN allows through to the MGC a proportion of the incoming call attempts in line with the percentage restriction factor received from the MGC.

The main disadvantage of the ETSI_NB control process is that a step change in the level of call attempts arriving at a MSAN, when the MSAN is already applying a percentage restriction factor, will still result in a step change in the call attempts forwarded to the MGC, possibly returning the MGC to overload. Indeed, ETSI_NR was introduced to overcome the dependence of the overload control process of ETSI_NB upon external changes.

SUMMARY

According to a first aspect of the present invention there is provided a gateway apparatus for interfacing an access network to a service network, the apparatus comprising:
 an input for receiving access requests from the access network at a first flow rate;
 an output for forwarding access requests to a gateway controller at a second flow rate; and
 a flow controller for controlling the flow of access requests from said input to said output, the flow controller comprising
  a receiver for receiving a restriction value from the gateway controller, first processing means for determining whether the received restriction value is more restrictive than any currently in use restriction value and, if so, for determining a leak rate on the basis of the received restriction value and the current second flow rate, and
  second processing means for allowing access requests to pass to said output at a rate up to the determined leak rate at least until a further restriction value is received.

Embodiments of the present invention provide a gateway apparatus that applies an overload control process based upon both a global parameter (received from the gateway controller) and an access request arrival rate at the gateway. This ensures that the second flow rate reflects the level of traffic at the gateway, whilst preventing subsequent surges at the gateway feeding through to the controller.

The apparatus may provide an interface between an access network and an IP network, for example an IP backbone of a telecommunications network.

The invention is applicable in particular to a gateway apparatus interconnecting a PSTN network to an IP network, where said gateway controller is a call control server and said access requests received at said input are off-hook notifications. More preferably, said output comprises an H.248 interface for communicating with said gateway controller.

Preferably, said first processing means is arranged to determine the leak rate on the basis of the received restriction value as a fraction of the previously used restriction value (one in the case that no restriction was previously in use), multiplied by said second flow rate.

Preferably, said first means is arranged, in the event that the restriction value is less restrictive than the currently in use restriction value, to determine a new leak rate on the basis of the received restriction value and the current first flow rate.

Preferably, said new flow rate is a target leak rate, and the first means is arranged to increase the current leak rate incrementally to said target leak rate. Said first means may be arranged to increase the leak rate after fixed time intervals, or after time intervals determined randomly between upper and lower limits.

According to a third aspect of the present invention there is provided a method of operating a gateway interfacing an access network to a service network, the method comprising:
 receiving access requests from the access network at a first flow rate;
 forwarding access requests to a gateway controller at a second flow rate;
 receiving a restriction value from the gateway controller;
 determining whether the received restriction value is more restrictive than any currently in use restriction value and, if so, determining a leak rate on the basis of the received restriction value and the current second flow rate; and
 restricting said second flow rate to the determined leak rate at least until a further restriction value is received.

According to a fourth aspect of the present invention there is provided a method of controlling an overload condition at a gateway controller of a communications network, the controller being responsible for a plurality of access gateways in the network, the method comprising:
 at the gateway controller, monitoring the load level on the controller to detect the occurrence of an overload condition and, when an overload condition is detected, determining a restriction value and sending this to the access gateways; and
 at each said gateway, determining whether the received restriction value is more restrictive than any currently in use restriction value and, if so, determining a leak rate on the basis of the received restriction value and the current second flow rate, and restricting said second flow rate to the determined leak rate at least until a further restriction value is received.

DETAILED DESCRIPTION

Figure 1:
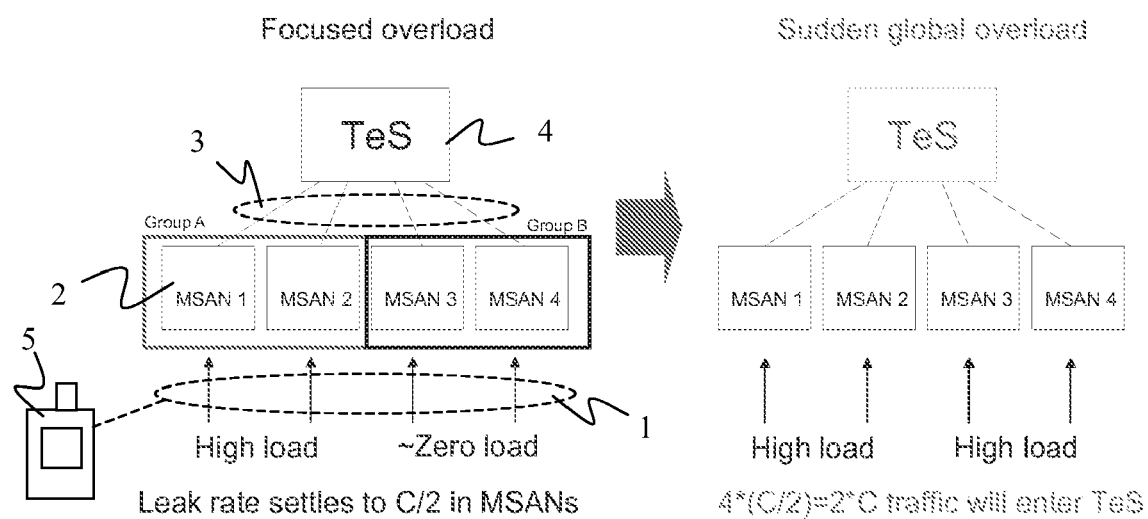
FIG. 1 illustrates schematically an overload condition arising in a telecommunications network.
Figure 2:
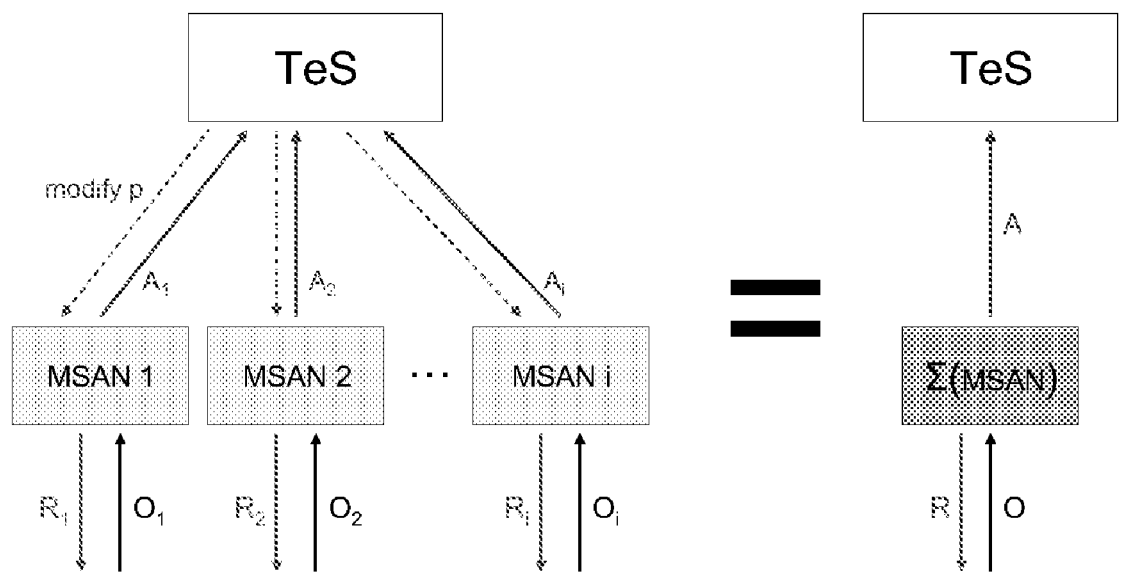
FIG. 2 illustrates schematically a telecommunications network showing terminology used in the detailed description.

With reference to FIG. 2, a telecommunication network may comprise a large number of Multi Service Access Nodes (MSANs) 1, denoted by MSAN1 to MSANi. For the purposes of illustration, it is assumed that these MSANs are connected to Public Switched Telephone Networks (PSTN) 2 and provide an interface between the PSTN media and signalling protocols and the IP-based protocols used to transfer media and signalling over an IP network 3 interconnecting the MSANs and various Telephony Servers (TeSs) 4. H.248 is the protocol used to carry call control signalling between the MSANs and the TeS(s).

A MSAN 1 receives off-hook notifications from terminals 5 attached to the PSTNs 2 and will relays these on to a controlling TeS as H.248 off-hook notifications. A TeS 4 will have a maximum call handling capacity, referred to here as TargetLoadLevel which results, for example, in 100% usage of the TeS's CPU. The current load is referred to here as LoadLevel. Each MSAN applies a "leaky-bucket" type restrictor, where the leak rate ($L_i$) is defined in terms of H.248 off-hook notifications per second.

With reference again to FIG. 2, the total off-hook arrival rate at the line interfaces of MSANi is denoted by $O_i$. Assume that a flow controller within MSANi is currently admitting $A_i$ H.248 off-hook notifications per second to the TeS. If we assume that no overload control process is in effect (or $L_i$ is higher that the arrival rate $O_i$), $A_i$ will be equal to $O_i$. If we assume further that the arrival rate at one or more of the MSANs increases to such an extent that the TeS becomes overloaded, the TeS must initiate an overload control process. It is proposed here to calculate at the TeS a restriction value p as a floating point number, where $0<=p<=1$, with the value of p depending on the current LoadLevel of the TeS. The same p value is sent to each of the MSANs, with sequential p values (over time) being denoted by $p_0, p_1, \ldots, p_t, \ldots$ etc.

Upon reception of a new restriction value p, an MSAN acts as follows:

If no overload control process is currently applied, or if $p_{t-1}>p$, then the off-hook limiter should be introduced or set to a more restrictive level. The current leak rate is immediately set to $L_i=(p/p_{t-1})*A_i$. It should be emphasised that the leak rate is (re)calculated based on the actual off-hook notification admission rate of that specific access gateway on its H.248 link to the CS.

If on the other hand a load control process is currently being applied and $p_{t-1}<=p$, then the currently applied restriction is too strict, and the leak rate $L_i$ rate of the MSAN is increased. A target leak rate ($T_i$) is first recalculated from the measured incoming call arrival rate $O_i$ (i.e. received over the PSTN) and the newly received restriction value p, i.e. as $T_i=p*O_i$. Rather than set the leak rate immediately to the target leak rate, the leak rate is increased in a stepwise manner from its current value to the target value. For example, the leak rate may be increased in steps of size $(T_i-L_i)/X$ (where X is some predefined integer) at fixed time intervals (of S seconds). It will be appreciated that those MSANs enforcing a lower leak rate then other MSANs, will increase their leak rate in larger steps, resulting in an equitable share of the TeS's resources.

Figure 3:
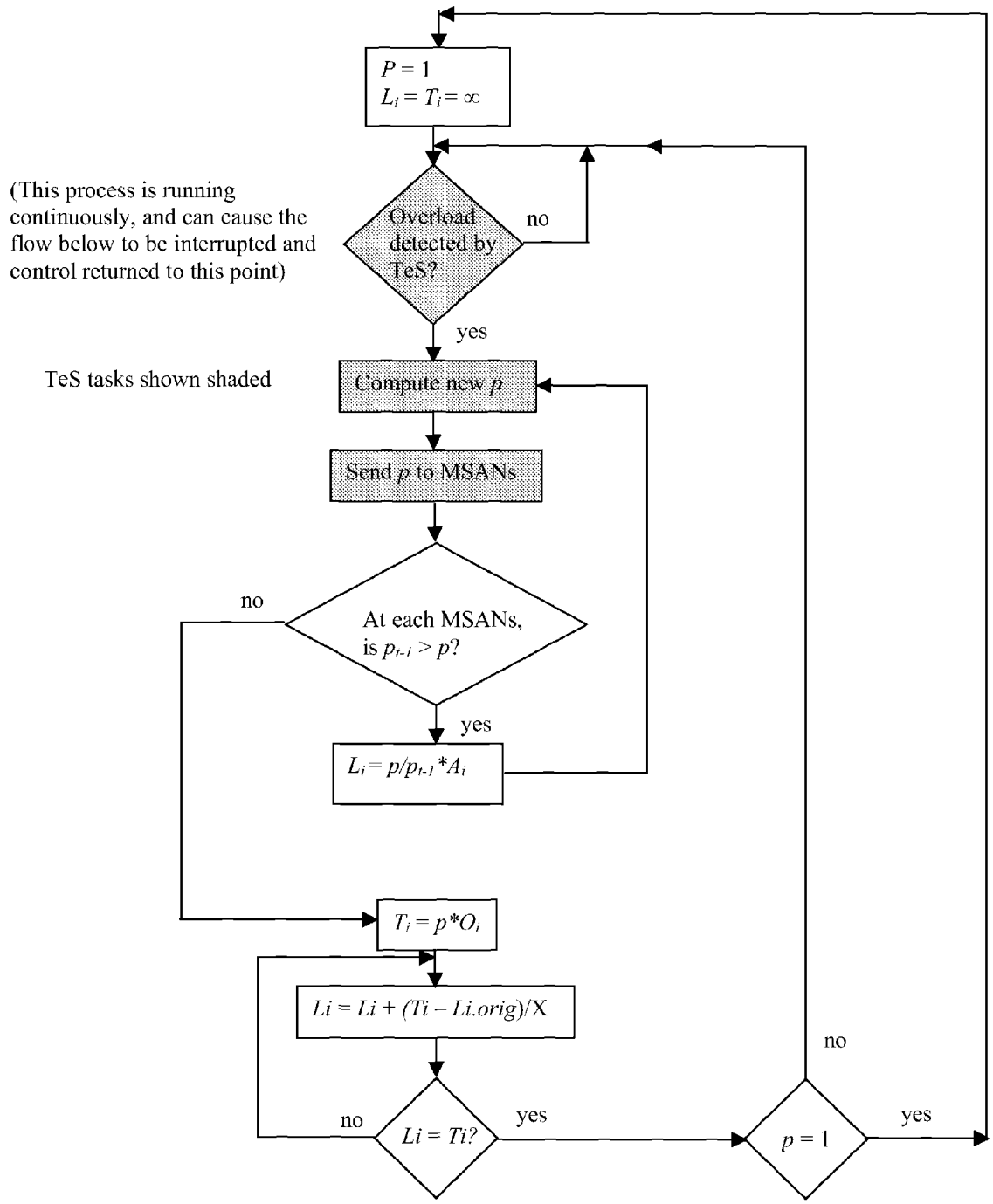
FIG. 3 is a flow diagram illustrating an overload control process.

FIG. 3 is a flow diagram illustrating the overload control process described above, assuming that the starting point for the restriction value is p=1 and that the leak rate Li has reached the target rate $T_i$ for all MSANs. [Li.orig is used to identify the value of Li at which the process starts.]

A possible drawback of this leak rate increasing approach is that the fixed S second timers and which trigger the step increases in leak rate towards the target rate, will tend to synchronise the individual load changes seen by the MGC from the various MSANs. There is a danger that this will lead to an oscillation of the control process and of the load offered to the MGC. To mitigate this synchronisation problem, S could be a uniform random variable in a preconfigured range (0 to $S_{max}$) determined individually by each MSAN. This will tend to smooth out the overall load changes seen by the TeS, giving the TeS more time to recalculate the restriction value p.

At the TeS, the network operator is free to choose any suitable performance indicator that can be measured in order to determining the restriction value p. An example algorithm for determining p is as follows:

The load level is based on the total number of served originating PSTN calls:

LoadLevel=OffHookArrivalRate/ServedCallRate (i.e. the capability of the TeS) TargetLoadLevel=1.0

In the case of an overload (LoadLevel>TargetLoadLevel && CPU occupancy~=100%):
The restriction value p should be (re)calculated based on the current LoadLevel and the TargetLoadLevel:

p=TargetLoadLevel/LoadLevel (so at 120% load the TeS orders the MSANs to admit only 83.3% of their off-hook requests).
In case of no overload (CPU occupancy <100%)

$p_t=p_{t-1}+A$

The restriction value p is increased by a small positive constant A until p=1.0 is reached. If p=1.0 then the MSANs can admit 100% of their offered call setup requests, so the overload has ceased and the control has terminated.

The overload control process described here delegates certain intelligence to the MSANs which is not required according to the prior art solutions (ETSI_NR and ETSI_NB). This has the effect of reducing the level of fluctuation of traffic offered to the TeS during overload, thus protecting the overloaded TeS. The process is also better able to deal with focused overload traffic cases as a result of the MSANs being able to set their own leak rates based upon the global restriction factor p, and can handle traffic cases with changing or highly fluctuating external call intensity. As the process is adaptive, there is no requirement to terminate the process as such, so premature termination can be avoided. Furthermore, the process is easily configurable and offers good scalability. The number of configuration parameters does not increase with the number of gateways.

It will be appreciated by the person of skill in the art that various modifications may be made to the above described embodiments without departing from the scope of the present invention. For example, whilst the above discussion has been concerned with telephony servers and MSANs, the invention can be applied to any network scenario where overload conditions can arise as a result of inter-node signalling.

The invention claimed is:
1. A gateway apparatus for interfacing an access network to a service network, the apparatus comprising:
 an input for receiving access requests from the access network at a first flow rate;
 an output for forwarding access requests to a gateway controller at a second flow rate; and a flow controller for controlling the flow of access requests from said input to said output, the flow controller comprising a receiver for receiving a restriction value from gateway controller, first processing means for determining whether the received restriction value is more restrictive than any currently in use restriction value and, if so, determining a leak rate on the basis of the ratio between the received restriction value divided by the currently in use restriction value, multiplied by the second flow rate, second processing means for allowing access requests to pass to said output at a rate up to the determined leak rate at least until a further restriction value is received.

2. The apparatus according to claim 1, the apparatus interfacing at access network and an IP network.

3. The apparatus according to claim 1, wherein said first processing means is arranged, in the event that the restriction value is less restrictive than the currently in use restriction value, to determine a new leak rate on the basis of the received restriction value and the current first flow rate.

4. The apparatus according to claim 2, wherein said access network is a PSTN network, and said gateway controller is a call control server and said access requests received at said input are off-hook notifications.

5. The apparatus according to claim 2, wherein said output comprises an H.248 interface for communicating with a gateway controller.

6. The apparatus according to claim 3, wherein said new flow rate is a target leak rate, and the first means is arranged to increase the current leak rate incrementally to said target leak rate.

7. The apparatus according to claim 6, wherein first means is arranged to increase the leak rate after fixed time intervals, or after time intervals determined randomly between upper and lower limits.

8. A method of operating a gateway interfacing an access network to a service network, the method comprising;

receiving access requests from the access network at a first flow rate;

forwarding access requests to a gateway controller at a second flow rate; receiving a restriction value from the gateway controller;

determining whether the received restriction value is more restrictive than any currently in use restriction value and, if so, determining a leak rate on the basis of the ratio between the received restriction value divided by the currently in use restriction value, multiplied by the second flow rate, and restricting said second flow rate to the determined leak rate at least until a further restriction value is received.

9. A method of controlling an overload condition at a gateway controller of a communications network, the controller being responsible for a plurality of access gateways in the network, the method comprising:

at the gateway controller, monitoring the load level on the controller to detect the occurrence of an overload condition and, when an overload condition is detected, determining a restriction value and sending this to the access gateways; and at each said gateway, determining whether the received restriction value is more restrictive than any currently in use restriction value and, if so, determining a leak rate on the basis of the ratio between the received restriction value divided by the currently in use restriction value, multiplied by the second flow rate, and restricting said second flow rate to the determined leak rate at least until a further restriction value is received.

* * * * *

UNITED STATES PATENT AND TRADEMARK OFFICE
CERTIFICATE OF CORRECTION

PATENT NO.        : 8,040,805 B2  
APPLICATION NO.   : 12/445060  
DATED             : October 18, 2011  
INVENTOR(S)       : Pongracz et al.

Page 1 of 1

It is certified that error appears in the above-identified patent and that said Letters Patent is hereby corrected as shown below:

On the Title Page, Item (57), under "ABSTRACT", Line 8, delete "restrict ion" and insert -- restriction --, therefor.

In Fig. 3, Sheet 3 of 3, in Line 4, delete "rcturncd" and insert -- returned --, therefor.

In Column 2, Line 58, delete "$G_aC*(m+n)/m.$" and insert -- $G_a=C*(m+n)/m.$ --, therefor.

In Column 7, Line 4, in Claim 1, delete "from" and insert -- from the --, therefor.

In Column 7, Line 15, in Claim 2, delete "1," and insert -- 1, wherein --, therefor.

In Column 7, Line 16, in Claim 2, delete "at access" and insert -- an access --, therefor.

In Column 8, Line 2, in Claim 8, delete "comprising;" and insert -- comprising: --, therefor.

Signed and Sealed this  
Thirty-first Day of January, 2012

David J. Kappos  
*Director of the United States Patent and Trademark Office*